United States Patent
Fadell et al.

(10) Patent No.: US 10,082,306 B2
(45) Date of Patent: *Sep. 25, 2018

(54) TEMPERATURE CONTROLLER WITH MODEL-BASED TIME TO TARGET CALCULATION AND DISPLAY

(71) Applicant: Google LLC, Mountain View, CA (US)

(72) Inventors: Anthony Michael Fadell, Portola Valley, CA (US); David Sloo, Palo Alto, CA (US); Matthew Rogers, Los Gatos, CA (US); Rangoli Sharan, Sunnyvale, CA (US); Michael Matas, San Francisco, CA (US); Yoky Matsuoka, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 14/789,786

(22) Filed: Jul. 1, 2015

(65) Prior Publication Data
US 2015/0300672 A1    Oct. 22, 2015

Related U.S. Application Data

(63) Continuation of application No. 12/984,602, filed on Jan. 4, 2011, now Pat. No. 9,104,211.
(Continued)

(51) Int. Cl.
*G05D 23/12* (2006.01)
*G05D 23/185* (2006.01)
(Continued)

(52) U.S. Cl.
CPC ...... *F24F 11/0012* (2013.01); *B01D 46/0086* (2013.01); *F24D 19/10* (2013.01);
(Continued)

(58) Field of Classification Search
CPC .... F24F 11/0009; F24F 11/0034; F24F 11/02; F24F 2011/0053; F24F 2011/0061
See application file for complete search history.

(56) References Cited

U.S. PATENT DOCUMENTS

| 4,223,831 A | 9/1980 | Szarka |
| 4,316,577 A | 2/1982 | Adams et al. |

(Continued)

FOREIGN PATENT DOCUMENTS

| CA | 2202008 C | 2/2000 |
| DE | 19609390 A1 | 9/1997 |

(Continued)

OTHER PUBLICATIONS

Braeburn Model 5200, Braeburn Systems, LLC, Jul. 20, 2011, 11 pages.
(Continued)

*Primary Examiner* — Larry Furdge
(74) *Attorney, Agent, or Firm* — Kilpatrick Townsend & Stockton LLP

(57) ABSTRACT

A thermostat is described for controlling air temperature in a building. The time associated with causing the controlled air temperature to reach a target temperature is estimated and displayed to a user. Input from a user indicating the target temperature can be received and the estimating and displaying can be carried out in real time. The thermostat can be wall-mounted or the user input can be received and estimated time can be displayed using a remote device, for example that communicates wirelessly with other components of the HVAC system.

16 Claims, 8 Drawing Sheets

Related U.S. Application Data

(60) Provisional application No. 61/429,093, filed on Dec. 31, 2010, provisional application No. 61/415,771, filed on Nov. 19, 2010.

(51) Int. Cl.

| | | |
|---|---|---|
| *F24F 11/00* | (2018.01) | |
| *G05D 23/19* | (2006.01) | |
| *F24D 19/10* | (2006.01) | |
| *B01D 46/00* | (2006.01) | |
| *G05B 15/02* | (2006.01) | |
| *H01R 9/24* | (2006.01) | |
| *G05B 13/02* | (2006.01) | |
| *F24F 11/30* | (2018.01) | |
| *F24F 11/62* | (2018.01) | |
| *F24F 11/89* | (2018.01) | |
| *H04W 4/70* | (2018.01) | |
| *F24F 110/00* | (2018.01) | |
| *F24F 110/10* | (2018.01) | |
| *F24F 120/10* | (2018.01) | |
| *F24F 140/60* | (2018.01) | |
| *F24F 11/32* | (2018.01) | |
| *F24F 130/40* | (2018.01) | |
| *F24F 120/20* | (2018.01) | |
| *F24F 11/63* | (2018.01) | |
| *F24F 11/64* | (2018.01) | |
| *F24F 11/56* | (2018.01) | |
| *F24F 11/61* | (2018.01) | |
| *F24F 11/46* | (2018.01) | |
| *F24F 11/52* | (2018.01) | |
| *F24F 11/39* | (2018.01) | |
| *F24F 11/47* | (2018.01) | |

(52) U.S. Cl.
CPC .......... *F24D 19/1084* (2013.01); *F24F 11/30* (2018.01); *F24F 11/62* (2018.01); *F24F 11/89* (2018.01); *G05B 13/0265* (2013.01); *G05B 15/02* (2013.01); *G05D 23/19* (2013.01); *G05D 23/1902* (2013.01); *G05D 23/1917* (2013.01); *H01R 9/2416* (2013.01); *H04W 4/70* (2018.02); *F24F 11/32* (2018.01); *F24F 11/39* (2018.01); *F24F 11/46* (2018.01); *F24F 11/47* (2018.01); *F24F 11/52* (2018.01); *F24F 11/56* (2018.01); *F24F 11/61* (2018.01); *F24F 11/63* (2018.01); *F24F 11/64* (2018.01); *F24F 2110/00* (2018.01); *F24F 2110/10* (2018.01); *F24F 2120/10* (2018.01); *F24F 2120/20* (2018.01); *F24F 2130/40* (2018.01); *F24F 2140/60* (2018.01); *Y02B 10/20* (2013.01); *Y02B 10/70* (2013.01); *Y02D 70/12* (2018.01); *Y02D 70/122* (2018.01); *Y02D 70/142* (2018.01); *Y02D 70/144* (2018.01); *Y02D 70/162* (2018.01); *Y10T 29/49826* (2015.01)

(56) References Cited

U.S. PATENT DOCUMENTS

| | | |
|---|---|---|
| 4,335,847 A | 6/1982 | Levine |
| 4,408,711 A | 10/1983 | Levine |
| 4,615,380 A | 10/1986 | Beckey |
| 4,621,336 A | 11/1986 | Brown |
| 4,674,027 A | 6/1987 | Beckey |
| 4,685,614 A | 8/1987 | Levine |
| 4,751,961 A | 6/1988 | Levine et al. |
| 4,768,706 A | 9/1988 | Parfitt |
| 4,897,798 A | 1/1990 | Cler |
| 5,005,365 A | 4/1991 | Lynch |
| D321,903 S | 11/1991 | Chepaitis |
| 5,088,645 A | 2/1992 | Bell |
| 5,211,332 A | 5/1993 | Adams |
| 5,240,178 A | 8/1993 | Dewolf et al. |
| D341,848 S | 11/1993 | Bigelow et al. |
| 5,294,047 A | 3/1994 | Schwer et al. |
| 5,395,042 A | 3/1995 | Riley et al. |
| 5,415,346 A | 5/1995 | Bishop |
| 5,428,964 A | 7/1995 | Lobdell |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| D396,488 S | 7/1998 | Kunkler |
| 5,808,602 A | 9/1998 | Sellers |
| 5,902,183 A | 5/1999 | D'Souza |
| 5,909,378 A | 6/1999 | De Milleville |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| D428,399 S | 7/2000 | Kahn et al. |
| 6,098,893 A | 8/2000 | Berglund et al. |
| 6,164,374 A | 12/2000 | Rhodes et al. |
| 6,206,295 B1 | 3/2001 | LaCoste |
| 6,209,794 B1 | 4/2001 | Webster et al. |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| D450,059 S | 11/2001 | Itou |
| 6,349,883 B1 | 2/2002 | Simmons et al. |
| 6,351,693 B1 | 2/2002 | Monie et al. |
| 6,356,204 B1 | 3/2002 | Guindi et al. |
| 6,431,457 B1 | 8/2002 | Dirkes, II |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| D471,825 S | 3/2003 | Peabody |
| 6,595,430 B1 | 7/2003 | Shah |
| 6,619,055 B1 | 9/2003 | Addy |
| D480,401 S | 10/2003 | Kahn et al. |
| 6,641,054 B2 | 11/2003 | Morey |
| 6,641,055 B1 | 11/2003 | Tiernan |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| D497,617 S | 10/2004 | Decombe et al. |
| 6,824,069 B2 | 11/2004 | Rosen |
| D503,631 S | 4/2005 | Peabody |
| 6,951,306 B2 | 10/2005 | Deluca |
| D511,527 S | 11/2005 | Hernandez et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,040,104 B2 | 5/2006 | Bogner et al. |
| 7,083,109 B2 | 8/2006 | Pouchak |
| 7,099,748 B2 * | 8/2006 | Rayburn ............... F24F 11/006 165/238 |
| 7,111,788 B2 | 9/2006 | Reponen |
| 7,114,554 B2 | 10/2006 | Bergman et al. |
| 7,117,129 B1 | 10/2006 | Bash et al. |
| 7,141,748 B2 | 11/2006 | Tanaka et al. |
| 7,142,948 B2 * | 11/2006 | Metz ............... G05B 19/0426 700/276 |
| 7,152,806 B1 | 12/2006 | Rosen |

(56) References Cited

U.S. PATENT DOCUMENTS

| | | |
|---|---|---|
| 7,159,790 B2 | 1/2007 | Schwendinger et al. |
| 7,181,317 B2 | 2/2007 | Amundson et al. |
| 7,222,494 B2 | 5/2007 | Peterson et al. |
| 7,225,054 B2 | 5/2007 | Amundson et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,299,996 B2 | 11/2007 | Garrett et al. |
| 7,302,642 B2 | 11/2007 | Smith et al. |
| 7,333,880 B2 | 2/2008 | Brewster et al. |
| D566,587 S | 4/2008 | Rosen |
| RE40,437 E | 7/2008 | Rosen |
| 7,392,661 B2 | 7/2008 | Alles |
| 7,418,663 B2 | 8/2008 | Pettinati et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| D593,120 S | 5/2009 | Bouchard et al. |
| D594,015 S | 6/2009 | Singh et al. |
| D595,309 S | 6/2009 | Sasaki et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,596,431 B1 | 9/2009 | Forman et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,778,734 B2 | 8/2010 | Oswald et al. |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,854,389 B2 | 12/2010 | Ahmed |
| D630,649 S | 1/2011 | Tokunaga et al. |
| 7,904,209 B2 | 3/2011 | Podgorny et al. |
| 7,904,830 B2 | 3/2011 | Hoglund et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| D648,735 S | 11/2011 | Arnold et al. |
| D651,529 S | 1/2012 | Mongell et al. |
| 8,090,477 B1 | 1/2012 | Steinberg |
| 8,091,794 B2 | 1/2012 | Siddaramanna et al. |
| 8,131,497 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 8,606,374 B2 | 12/2013 | Fadell et al. |
| 9,104,211 B2 | 8/2015 | Fadell et al. |
| 2002/0005435 A1 | 1/2002 | Cottrell |
| 2003/0112262 A1 | 6/2003 | Adatia et al. |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1* | 12/2004 | Hull ............ F24F 11/0086 236/91 R |
| 2005/0055432 A1 | 3/2005 | Rodgers |
| 2005/0071780 A1 | 3/2005 | Muller et al. |
| 2005/0119766 A1 | 6/2005 | Amundson et al. |
| 2005/0119793 A1 | 6/2005 | Amundson et al. |
| 2005/0128067 A1 | 6/2005 | Zakrewski |
| 2005/0159847 A1 | 7/2005 | Shah et al. |
| 2005/0159924 A1* | 7/2005 | Shah ............ G05B 23/0264 702/183 |
| 2005/0189429 A1 | 9/2005 | Breeden |
| 2005/0192915 A1 | 9/2005 | Ahmed et al. |
| 2005/0194455 A1 | 9/2005 | Alles |
| 2005/0204997 A1 | 9/2005 | Fournier |
| 2005/0280421 A1 | 12/2005 | Yomoda et al. |
| 2006/0079983 A1 | 4/2006 | Willis |
| 2006/0186214 A1 | 8/2006 | Simon et al. |
| 2006/0196953 A1 | 9/2006 | Simon et al. |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0115902 A1 | 5/2007 | Shamoon et al. |
| 2007/0158442 A1 | 7/2007 | Chapman et al. |
| 2007/0173978 A1 | 7/2007 | Fein et al. |
| 2007/0225867 A1 | 9/2007 | Moorer et al. |

(56) References Cited

U.S. PATENT DOCUMENTS

| | | |
|---|---|---|
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0006709 A1 | 1/2008 | Ashworth et al. |
| 2008/0015742 A1 | 1/2008 | Kulyk et al. |
| 2008/0054082 A1 | 3/2008 | Evans et al. |
| 2008/0191045 A1 | 8/2008 | Harter |
| 2008/0245480 A1 | 10/2008 | Knight et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0005912 A1 | 1/2009 | Srivastava et al. |
| 2009/0062970 A1 | 3/2009 | Forbes, Jr. et al. |
| 2009/0112335 A1 | 4/2009 | Mehta et al. |
| 2009/0140056 A1 | 6/2009 | Leen |
| 2009/0140057 A1 | 6/2009 | Leen |
| 2009/0143916 A1 | 6/2009 | Boll et al. |
| 2009/0171862 A1 | 7/2009 | Harrod et al. |
| 2009/0195349 A1 | 8/2009 | Frader-Thompson et al. |
| 2009/0216380 A1 | 8/2009 | Kolk |
| 2009/0254225 A1 | 10/2009 | Boucher et al. |
| 2009/0259713 A1 | 10/2009 | Blumrich et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2009/0297901 A1 | 12/2009 | Kilian et al. |
| 2009/0312999 A1 | 12/2009 | Kasztenny et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0163633 A1 | 7/2010 | Barrett et al. |
| 2010/0167783 A1 | 7/2010 | Alameh et al. |
| 2010/0198425 A1 | 8/2010 | Donovan |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0035060 A1 | 2/2011 | Oswald |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077896 A1 | 3/2011 | Steinberg et al. |
| 2011/0106328 A1 | 5/2011 | Zhou et al. |
| 2011/0153089 A1 | 6/2011 | Tiemann et al. |
| 2011/0160913 A1 | 6/2011 | Parker et al. |
| 2011/0167369 A1 | 7/2011 | van Os |
| 2011/0185895 A1 | 8/2011 | Freen |
| 2011/0196539 A1 | 8/2011 | Nair et al. |
| 2011/0251933 A1 | 10/2011 | Egnor et al. |
| 2011/0307103 A1 | 12/2011 | Cheung et al. |
| 2012/0065935 A1 | 3/2012 | Steinberg et al. |
| 2012/0085831 A1 | 4/2012 | Kopp |
| 2012/0131504 A1 | 5/2012 | Fadell et al. |
| 2012/0158350 A1 | 6/2012 | Steinberg et al. |
| 2012/0221151 A1 | 8/2012 | Steinberg |

FOREIGN PATENT DOCUMENTS

| | | |
|---|---|---|
| EP | 434926 A2 | 7/1991 |
| EP | 196069 B1 | 12/1991 |
| EP | 720077 A2 | 7/1996 |
| EP | 802471 A2 | 10/1997 |
| EP | 1065079 A2 | 1/2001 |
| EP | 1731984 A1 | 12/2006 |
| EP | 2157492 A2 | 2/2010 |
| EP | 1703356 B1 | 9/2011 |
| GB | 2212317 B | 5/1992 |
| JP | 59106311 A | 6/1984 |
| JP | 01252850 A | 10/1989 |
| JP | 11020824 | 1/1999 |
| JP | 2002087050 A | 3/2002 |
| JP | 2003054290 A | 2/2003 |
| NL | 1024986 C2 | 6/2005 |
| WO | 02/35304 A2 | 5/2002 |
| WO | 0248851 A2 | 6/2002 |
| WO | 2009073496 A2 | 6/2009 |
| WO | 2011128416 A2 | 10/2011 |
| WO | 2012068453 A1 | 5/2012 |

OTHER PUBLICATIONS

Braeburn 5300 Installer Guide, Braeburn Systems, LLC, Dec. 9, 2009, 10 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
Venstar T5800 Manual, Venstar, Inc., Sep. 7, 2011, 63 pages.
International Patent Application PCT/US2011/061379, International Search Report and Written Opinion dated Mar. 30, 2012, 7 pages.
Aprilaire Electronic Thermostats Model 8355 User's Manual, Research Products Corporation, Dec. 2000, 16 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps Washington State University Extension Energy Program, Apr. 2010, pp. 1-3.
Energy Joule Ambient Devices, 2011. Retrieved from: http://web.archive.org/web/20110723210421/http://www.ambientdevices.com/products/energyjoule.html on Aug. 1, 2012, 3 pages.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., Aug. 14, 2012, 8 pages.
ICY 3815TT-001 Timer-Thermostat Package Box, ICY BV Product Bar Code No. 8717953007902, 2009, 2 pages.

(56) References Cited

OTHER PUBLICATIONS

Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May, 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
The Perfect Climate Comfort Center PC8900A W8900A-C Product Data Sheet, Honeywell International Inc., Apr. 2001, 44 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
VisionPRO Wi-Fi Programmable Thermostat, Honeywell International, Inc., Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
U.S. Appl. No. 60/512,886 Volkswagen Rotary Knob for Motor Vehicle—English Translation of German Application filed Oct. 20, 2003.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.
Arens et al., "Demand Response Enabling Technology Development", Phase I Report: Jun. 2003-Nov. 2005, Jul. 27, P:DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Auslander et al., "UC Berkeley DR Research Energy Management Group", Power Point Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Green, "Thermo Heat Tech Cool", Popular Mechanics Electronic Thermostat Guide, Oct. 1985, pp. 155-158.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Meier et al., "Thermostat Interface Usability: A Survey", Ernest Orlando Lawrence Berkeley National Laboratory, Environmental Energy Technologies Division, Berkeley California, Sep. 2010, pp. 1-73.
Mozer, "The Neural Network House: An Environmental that Adapts to its Inhabitants", AAAI Technical Report SS-98-02, 1998, pp. 110-114.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort At Home: Design of a Residential Thermostat to Achieve Thermal Comfort, and Save Money and Peak Energy", University of California Berkeley, Mar. 2007, 1 page.
Salus, "S-Series Digital Thermostat Instruction Manual-ST620 Model No. Instruction Manual", www.salus-tech.com, Version 005, Apr. 29, 2010, 24 pages.
Sanford, "iPod (Click Wheel) (2004)", www.apple-history.com [retrieved on Apr. 9, 2012]. Retrieved from: http://apple-history.com/ipod, Apr. 9, 2012, 2 pages.
Wright et al., "DR ETD—Summary of New Thermostate, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
International Patent Application No. PCT/US2011/051579, International Search Report and Written Opinion dated Jan. 6, 2012, 13 pages.
International Search Report and Written Opinion dated Mar. 30, 2012, for International Patent Application No. PCT/US2011/061379 filed Nov. 18, 2011, 7 pages.
International Preliminary Report on Patentability dated May 21, 2013, for International Patent Application No. PCT/US2011/061379 filed Nov. 18, 2011, 6 pages.

\* cited by examiner

TEMPERATURE CONTROLLER WITH MODEL-BASED TIME TO TARGET CALCULATION AND DISPLAY

CROSS REFERENCES

This application is a continuation of U.S. patent application Ser. No. 12/984,602, filed Jan. 4, 2011, which claims priority to U.S. Provisional No. 61/429,093, filed Dec. 31, 2010 and claims priority to U.S. Provisional No. 61/415,771, filed Nov. 19, 2010. This application is hereby incorporated by reference for all purposes.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention generally relates to temperature control systems. More particularly, embodiments of this invention relate to devices for controlling temperature in a building, such as a HVAC system and/or a water heating system, wherein the estimated time to reach a target temperature is displayed to a user.

Building heating ventilation and air-conditioning (HVAC) systems account for a significant percentage of total energy consumption. Thus, a significant savings in HVAC energy usage can have an impact on total energy consumption. Programmable thermostats have been commercially available for many years and are used in many residential and light industrial settings. However, the typical user in the residential and light-industrial setting is relatively unsophisticated in terms of HVAC technology and efficiency. Despite the fact that HVAC energy use makes up a significant portion of total energy use in a residential or light industrial setting, a typical residential or light industrial occupant using a thermostat to manually input a set point or target temperature—either to increase the current temperature in the case of heating, or decrease the current temperature in the case of cooling—does not have a good understanding of how much energy is required to carry out the increase or decrease in temperature being called for. For example, a typical user does not have a good idea of how much energy it takes to raise the temperature of his or her dwelling by various amounts on a cold winter day. Some sophisticated thermostats are capable of calculating and displaying cost information associated with set point changes. For example, see U.S. Pat. No. 7,392,661, which discusses an HVAC system controller which estimates the energy cost or savings incurred due to a user-instigated change in a climate control schedule. Estimated costs or savings can be displayed to the user in an effort to give the user a basis for making decisions. However, it is believed that displaying costs and/or savings alone does not necessarily give many users a good awareness of HVAC system usage.

SUMMARY

According to some embodiments a method is provided for controlling air temperature in a building, such as with an HVAC system. The method includes estimating an amount of time associated with the controlled air temperature reaching a target temperature; and displaying information to a user representative of the estimated amount of time. According to some embodiments, input from a user indicating the set point or target temperature can be received, and the estimating and displaying can be carried out in real time. The method can also include receiving further targets from a user and re-estimating and displaying an updated time to reach the target temperature. The method can be carried out using a wall-mounted thermostat or using a remote unit via wireless communication.

According to some embodiments, the displayed information includes a numeric representation of the estimated amount of time to reach the target temperature. The information includes can also a graphical representation of the estimated amount of time. The method can be used with an HVAC system that includes single-stage and/or multi-stage heating and/or cooling functionality.

According to some embodiments, the method can include estimating an amount of energy and/or cost associated with causing the controlled air temperature to reach the target temperature; and displaying energy information and/or cost to a user representative of the estimated amount of energy.

According to some embodiments, a system is provided for controlling air temperature in a building. The system includes a processing system adapted and programmed to estimate an amount of time associated with causing the controlled air temperature to reach a target temperature; and a display adapted to display to a user information representative of the estimated amount of time. According to some embodiments, the system is a circular thermostat which can have a rotating outer member adapted to receive input from a user indicating the target temperature.

According to some embodiments a system for controlling temperatures other than air temperature are provided, such a controlling system forming part of a hot water heating system.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "target temperature" refers to a temperature, such as a set point temperature toward which a structure or enclosure being conditioned by an HVAC system is moving. The change in temperature toward a target temperature may be under active heating or cooling by the HVAC system and/or it may be due to passive effects such as drifting due to influence of conditions external to the enclosure or structure being conditioned.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
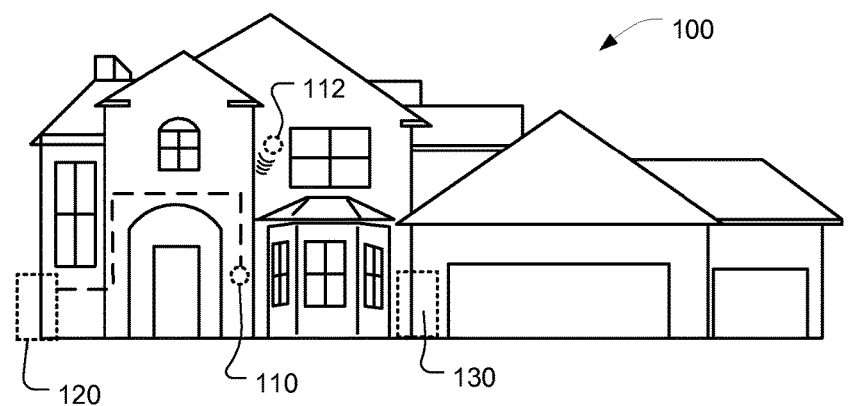
FIG. 1 is a diagram of an enclosure for which thermodynamic behavior is predicted, according to some embodiments.

FIG. 1 is a diagram of an enclosure in which temperature is controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 has a cooling capacity less than about 5 tons. According to some embodiments, temperature is controlled by other systems such as hot water heater 130. According to some embodiments, a remote device 112 wirelessly communicates with the thermostat 110 and can be used to display information to a user and to receive user input from the remote location of the device 112. According to some embodiments, the device 112 can be located outside of the enclosure 100.

Figure 2:
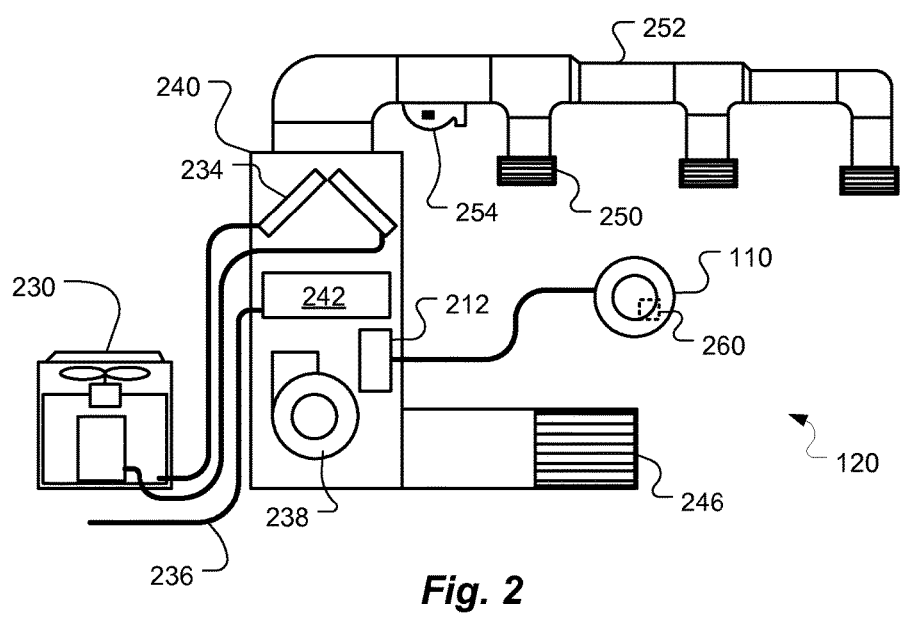
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used such as hydronic, in-floor radiant heating, heat pump, etc. In heating, heating coils or elements 242 within air handler 240 provide a source of heat using electricity or gas via line 236. Cool air is drawn from the enclosure via return air duct 246 through fan 238 and is heated heating coils or elements 242. The heated air flows back into the enclosure at one or more locations via supply air duct system 252 and supply air grills such as grill 250. In cooling an outside compressor 230 passes gas such as freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
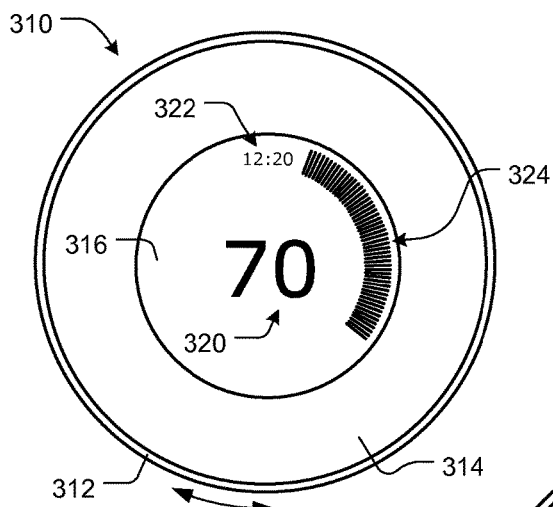
FIGS. 3A, 3B and 3C illustrate a thermostat for controlling temperature in an enclosure, according to some embodiments.
Figure 3B:
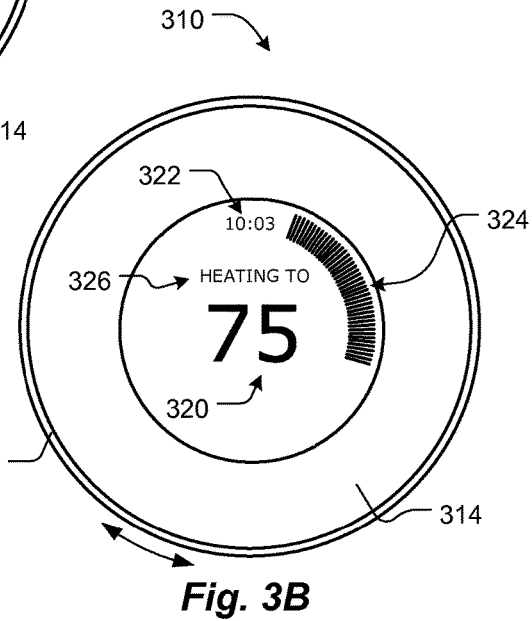
Figure 3C:
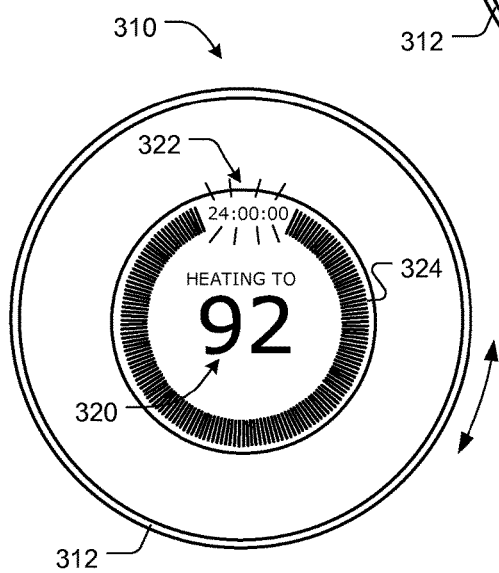

FIGS. 3A, 3B and 3C illustrate a thermostat for controlling temperature in an enclosure, according to some embodiments. Thermostat 310 includes control circuitry and is electrically connected to an HVAC system, such as thermostat 110 in FIGS. 1 and 2. Thermostat 310 is wall mounted, is circular in shape and has an outer rotatable ring 312 for receiving user input. Thermostat 310 has a large frontal display area 314. According to some embodiments, thermostat 310 is approximately 80 mm in diameter. The outer ring 312 allows the user to make adjustments, such as selecting a new target temperature. For example by rotating the outer ring 312 clockwise, the target temperature can be increased, and by rotating the outer ring 314 counter-clockwise, the target temperature can be decreased. According to some embodiments, the large central numbers 320 can be used to display the current temperature to users, as is shown in FIG. 3A. According to some embodiments a portion 316 of the display area 314 can be used to display a color that is associated with the current HVAC function. For example, if the HVAC system is currently heating the enclosure, the area 316 can be shown in red. If the HVAC system is currently cooling the enclosure, the area 316 can be shown in blue. If the HVAC system is neither heating or cooling, the area 316 can be shown in a neutral color, or a color such a black which is used as the background color for the display area 314.

According to some embodiments, the thermostat 310 displays the estimated time to reach the current target temperature. In the example shown, the time to reach the target temperature is displayed to the user in two ways. Numbers 322 display the numerical time in hours, minutes and seconds which is estimated to be needed to reach the target temperature. Additionally, or alternatively according to some embodiments, a graphical display 324 is used to indicate the amount of time to reach the target temperature. Thus as time elapses and the temperature in the enclosure gets closer to the target temperature, the numerical display 322 and the graphical display 324 change to reflect shorter times.

In FIG. 3B, the central numbers 320 display the target temperature, which in this case is 75 degrees. The smaller words 326 are used to indicate to the user that the central numbers represent the target temperature, instead of the current temperature, as well as indicate the HVAC function (e.g. heating or cooling) that is currently active. According to some embodiments, when the current temperature and the target temperature differ by more than a predetermined amount, for example 2 degrees, the central numbers 320 alternate between the current temperature as shown in FIG. 3A and the target temperature as shown in FIG. 3B. According to some embodiments, other graphical means, such as slowly oscillating the size of the numbers 320 can also be used to indicate that the HVAC system in the process of moving the enclosure temperature towards a target temperature. According to some embodiments, the target temperature is displayed as in FIG. 3B whenever the target temperature is being altered, such as when a user is making adjustments to the target, such as by rotating the outer ring 312 or by remote control, or when the target is automatically being adjusted according, for example, to a predetermined program. According to some embodiments, thermostat 310 is a remote unit, such as portable table-top thermostat controller and display unit, which is adapted to communicate wirelessly with a thermostat or component of an HVAC control system. According to some embodiments the target temperature is provided remotely by a user, for example, using a smart phone or remote internet connection from a location outside the enclosure, and the estimated time to reach the new target is displayed the user on the remote device.

According to some embodiments, a maximum time can be displayed, such as 24 hours, if the estimated time to reach the target temperature is greater than that amount, or if it is estimated that the HVAC system is unable to obtain the target temperature given its capacity and/or other conditions (e.g. such as outdoor temperature). FIG. 3C illustrates an example of such a display mode. In this example, the target temperature has been set to a high temperature as indicated by central number display 320. The graphical display 324 is showing a maximum time. Numerical display 322 is showing a maximum time, in this case 24 hours. According to some embodiments, the numerical display 322 and/or the graphical display 324 can blink so as to indicate a warning or error to the user.

Figure 4:
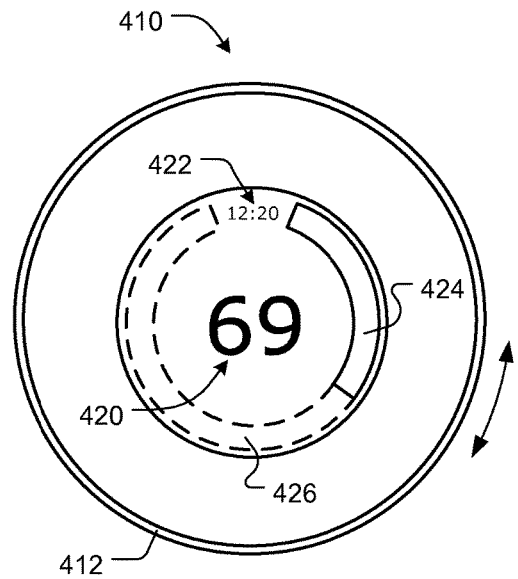
FIG. 4 shows a thermostat adapted to display time to reach a target temperature, according to some other embodiments.

FIG. 4 shows a thermostat adapted to display time to reach a target temperature according to some other embodiments. Thermostat 410 is similar to thermostat 310 as shown in FIGS. 3A, 3B and 3C with a large display area, rotatable outer ring 412, large central numbers 420 and numerical time to a target temperature display 422. However, the graphical display 424 is slightly different in that it shows a solid curved bar that fills up an annular section 426 instead of a group of radial bars such as shown in FIGS. 3A, 3B and 3C.

Figure 5A:
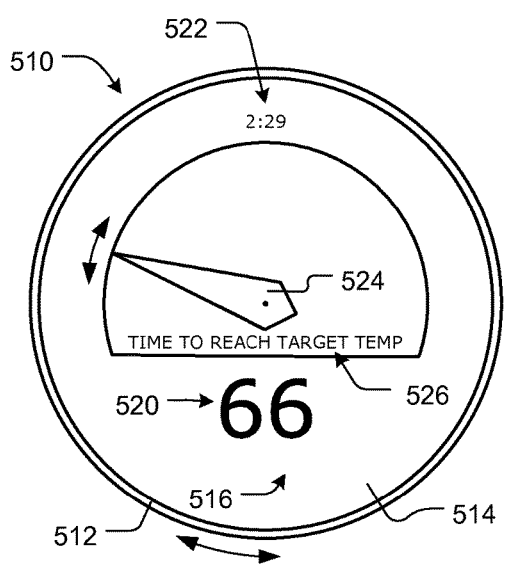
FIGS. 5A, 5B and 5C show a thermostat adapted to display time to reach a target temperature, according to some other embodiments.
Figure 5B:
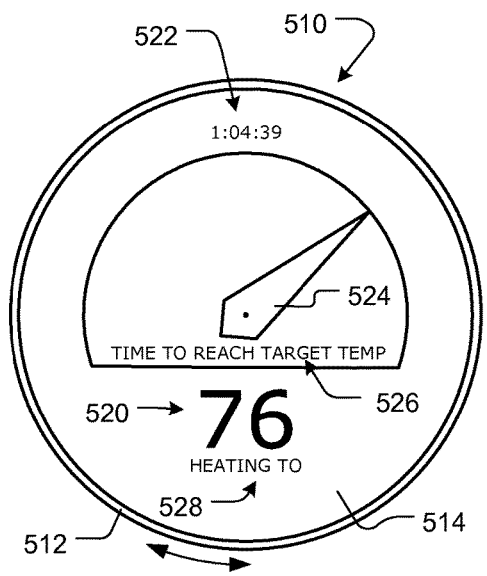
Figure 5C:
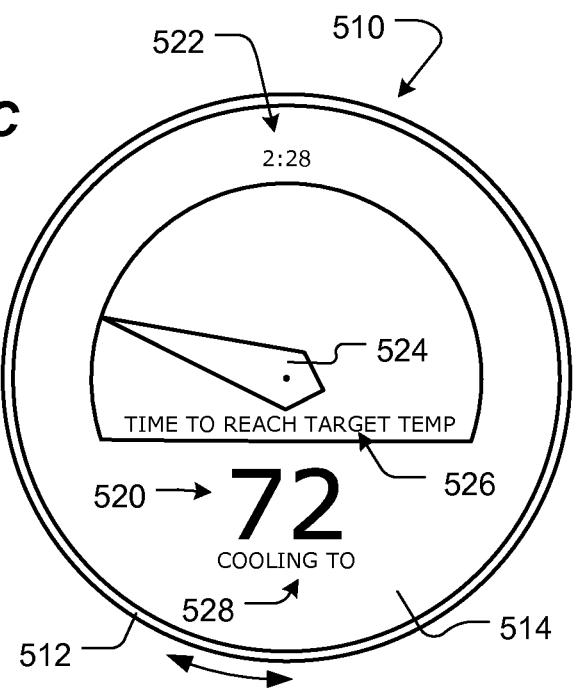

FIGS. 5A, 5B and 5C show a thermostat adapted to display time to reach a target temperature, according to some other embodiments. Thermostat 510 includes control circuitry and is electrically connected to an HVAC system, such as thermostat 110 in FIGS. 1 and 2. Thermostat 510 is circular in shape and has an outer rotatable ring 512 for receiving user input. Thermostat 510 has a large frontal display area 514. According to some embodiments, thermostat 510 is approximately 80 mm in diameter. The outer ring 512 allows the user to make adjustments, such as selecting a new target temperature, as is described with respect to FIGS. 3A-3C. According to some embodiments, the large numbers 520 can be used to display the current temperature to users, as is shown in FIG. 5A. According to some embodiments, the thermostat 510 displays the estimated time to reach the current target temperature. In addition to the numerical display 522, according to some embodiments, a graphical display in the form of a needle 524 is used to indicate the amount of time to reach the target temperature. Label 526 informs the user that the needle position represents the estimated time to reach the target temperature. Thus, as time elapses and the temperature in the enclosure gets closer to the target temperature, the numerical display 522 and the graphical display 524 change to reflect shorter times.

In FIG. 5B, the central numbers 520 display the target temperature, which in this case is 76 degrees. The smaller words 528 are used to indicate to the user that the central numbers represent the target temperature, instead of the current temperature, as well as to indicate the HVAC function (e.g. heating or cooling) that is currently active. In FIG. 5C, illustrates an example of when the HVAC cooling system is active, according to some embodiments. In the example shown, the central numbers 520 display the target temperature, which in this case is 72 degrees. The smaller words 528 are used to indicate to the user that the central numbers represent the target temperature, instead of the current temperature, as well as to indicate that the HVAC cooling function is currently active.

Figure 6:
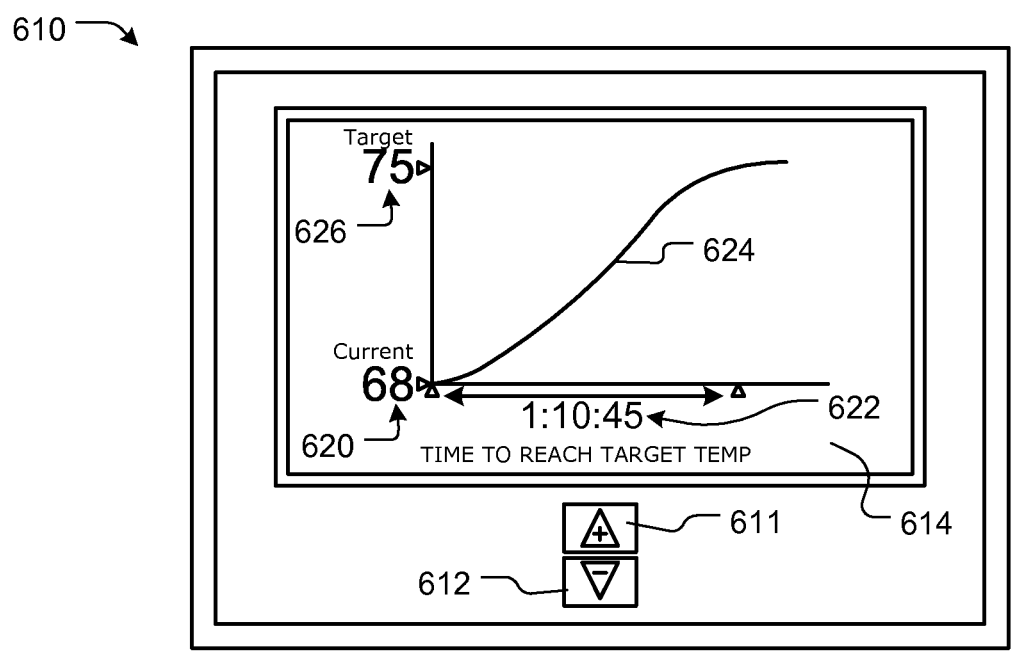
FIG. 6 illustrates a thermostat displaying time to reach target temperature information, according to some other embodiments.

FIG. 6 illustrates a thermostat displaying time to reach target temperature information, according to some other embodiments. Thermostat 610 is a rectangular wall mounted thermostat having a large graphical display area 614. The user can manually input changes in target temperature using buttons 611 and 612. The display area 614 includes a graphical plot curve 624 that represents the time estimated to reach the target temperature. The vertical axis represents temperature and shows the current temperature 620 and the target temperature 626. The horizontal axis represents time, and displays the estimated time 622 to reach the target temperature.

Figure 7:
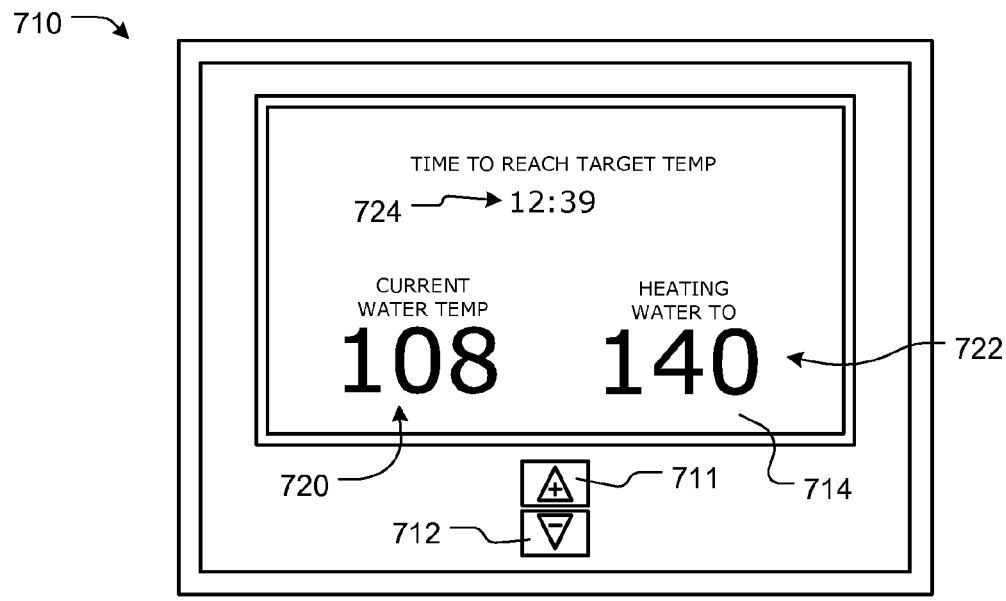
FIG. 7 illustrates a water heater control unit capable of displaying time to reach target temperature, according to some embodiments.

According to some embodiments, a controller for controlling temperature in applications other than HVAC are provided. For example, FIG. 7 illustrates a water heater control unit capable of displaying the time to reach a target temperature, according to some embodiments. Water temperature controller 710 has a large graphical display area 714. The user can manually input changes to the target temperature using buttons 711 and 712. The display area 714 includes the current water temperature 720, the target temperature 722 and the estimated time 724 to reach the target temperature.

Providing a thermostat that displays the estimated time to reach a target temperature advantageously conveys to the user an impact of the target temperature decision on energy use as well as an increased awareness of HVAC system usage. When a user makes a decision to manually input a new target temperature, the user receives important feedback as to how hard the HVAC system needs to work to obtain that temperature. It has been found that time is a very good parameter to display to a user in order to convey to an average non-technical user the relative effort or difficulty for the HVAC system to obtain a given target temperature. As described more fully below, according to some embodiments, the display of the estimated time to reach the new target temperature is made in real time, so that the user can nearly immediately see the impact of the user's decisions. It has been found that in this way, the user is advantageously trained or educated so as to become more intuitively familiar with the HVAC system, which in turn leads to more economical and environmentally friendly use of energy. It has been found that many HVAC users falsely believe that setting a higher target temperature will make the space warm up faster in the case of heating, and/or believe that setting a lower target temperature will make the space cool down faster in the case of cooling. Displaying the time to reach the target temperature thus educates that user that this is usually not the case. Although displaying the time to the target temperature may not directly save energy, it gives the user a better understanding about HVAC usage and may therefore allow for greater savings in the long run. According to other embodiments, other parameters than time can be displayed to a user to provide useful feedback to the user.

Figure 8:
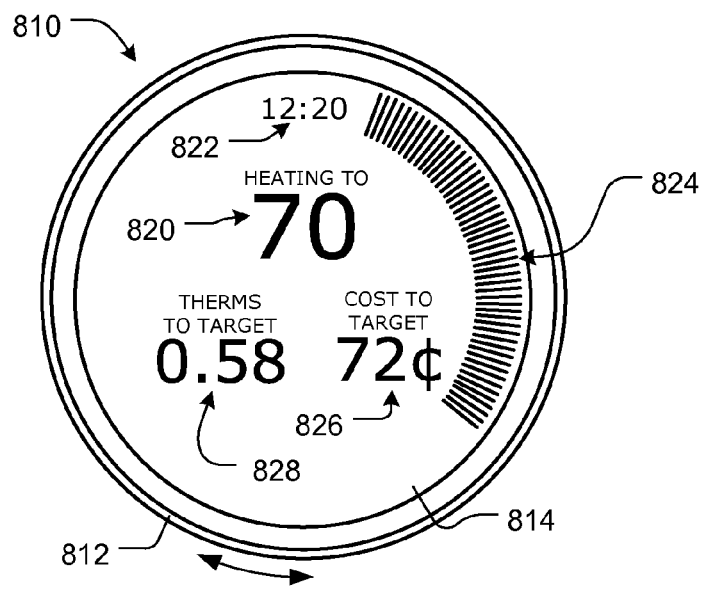
FIG. 8 illustrates a thermostat capable of displaying time as well as other values associated with reaching a target temperature, according to some embodiments.

FIG. 8 illustrates a thermostat capable of displaying time as well as other values associated with reaching a target temperature, according to some embodiments. Thermostat 810 is a circular wall mounted thermostat having a large graphical display 814 adapted to display information to a user, and a rotatable outer ring 812 adapted to receive user input. As in the case of other embodiments described above, the display area 814 includes a numerical display 820 of the target temperature and/or the current temperature. The time estimated to reach the target temperature is displayed both graphically by bars 824 and numerically by the hours, minutes and seconds display 822. Additionally, other information is displayed to the user relating to reaching the target temperature, including estimated Therms 828 to reach the target temperature, and the estimated cost 826 to reach the target temperature. According to some embodiments, other units of energy such as Calories and/or joules are displayed instead of, or in addition to Therms display 828.

Figure 11:
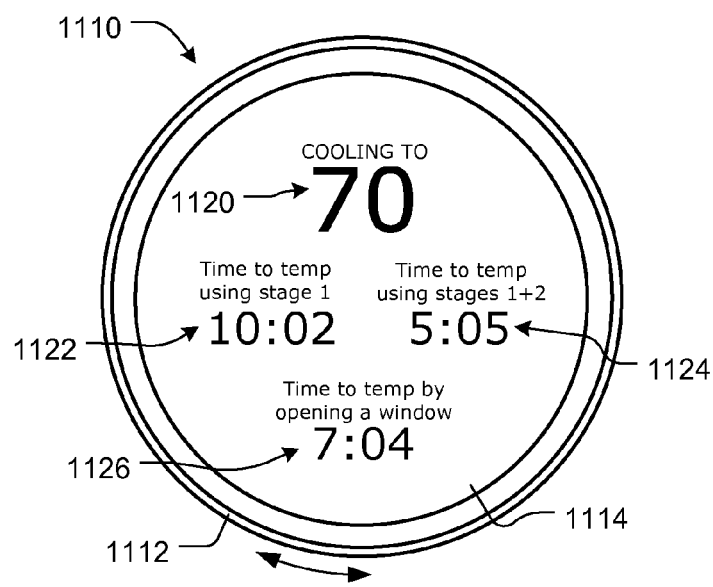
FIG. 11 illustrates a thermostat capable of displaying times to reach target temperature based on various factors, according to some embodiments.

FIG. 11 illustrates a thermostat capable of displaying times to reach target temperature based on various factors, according to some embodiments. Thermostat 1110 is a circular wall mounted thermostat having a large graphical display 1114 adapted to display information to a user, and a rotatable outer ring 1112 adapted to receive user input. As in the case of other embodiments described above, the display area 1114 includes a numerical display 1120 of the target temperature and/or the current temperature. Multiple times are calculated and displayed to the user based on the use of resources. For example, display 1122 shows the time to the target temperature when using a single stage, and display 1124 shows the time to the target temperature when using two stages in a building having a multi-stage equipped HVAC system. Additionally, according to some embodiments a display 1126 displays the time to reach the target temperature by using passive resources, such as opening a window. By displaying information such as shown in FIG. 11, the user can be educated as to the behavior of the conditioned enclosure under the influence of various passive and active conditioning systems.

Figure 12A:
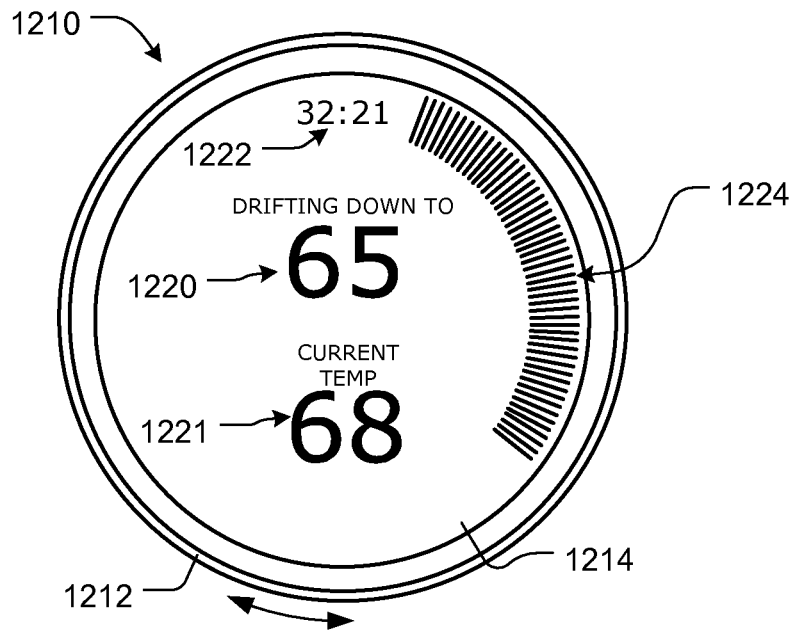
FIGS. 12A-B illustrate a thermostat capable of displaying time to reach a target temperature without active HVAC system control, according to some embodiments
Figure 12B:
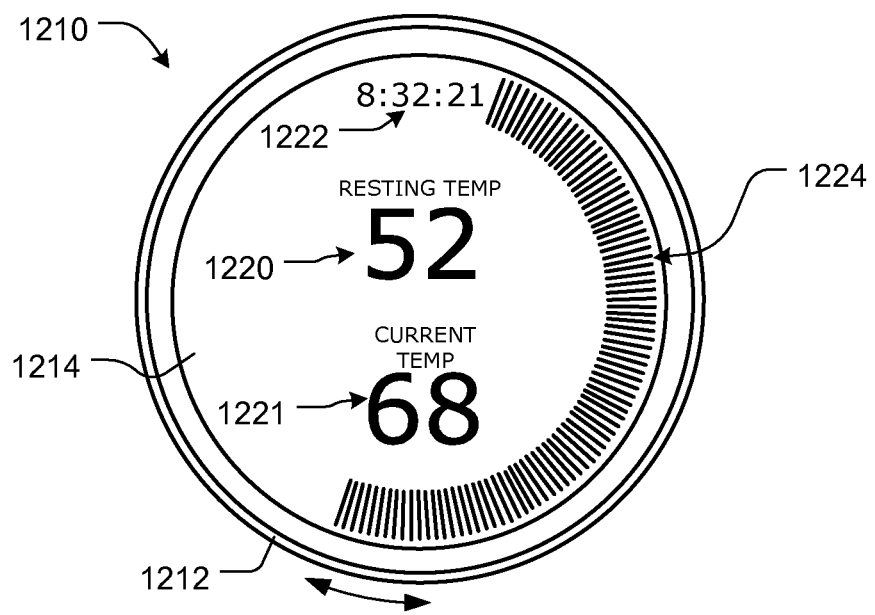

FIGS. 12A-B illustrate a thermostat capable of displaying time to reach a target temperature without active HVAC system control, according to some embodiments. Thermostat 1210 is a circular wall mounted thermostat having a large graphical display 1214 adapted to display information to a user, and a rotatable outer ring 1212 adapted to receive user input. As in the case of other embodiments described above, the display area 1214 includes a numerical display 1220 of the target temperature and/or the current temperature 1221. The time estimated to reach the target temperature is displayed both graphically by bars 1224 and numerically by the hours, minutes and seconds display 1222. In the case of FIG. 12A, the time to reach the target temperature 1220 is calculated and displayed as drifting, that is, without active HVAC input. For example the display as shown in FIG. 12A could be used when the target temperature is being lowered during the nighttime or an expected un-occupied time. In the case of FIG. 12B the target temperature is a resting temperature which is calculated as the temperature the conditioned area would come to rest at without any active HVAC system input. By displaying information such as illustrated in FIGS. 12A and 12B, the user can be further educated as to the behavior of the conditioned enclosure.

Figure 9:
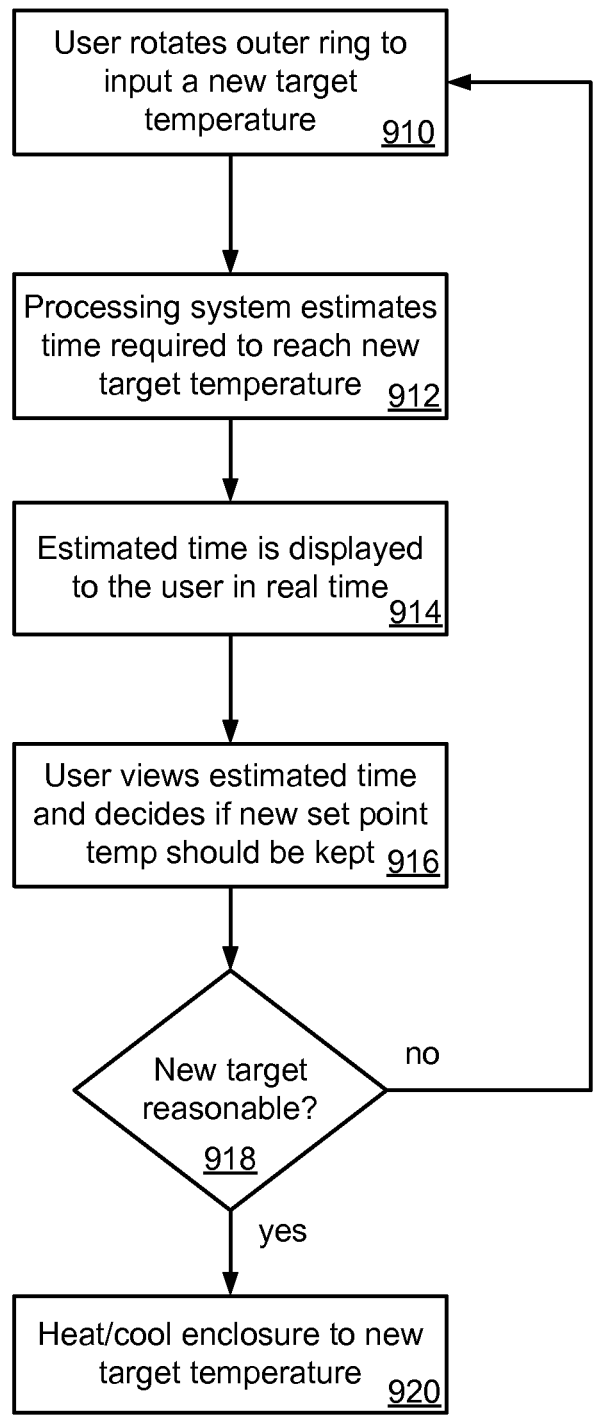
FIG. 9 is a flow chart showing steps in real time display of estimated time to reach a target, temperature according to some embodiments.

FIG. 9 is a flow chart showing steps in real time display of estimated time to reach a target temperature, according to some embodiments. In step 910 the user inputs a new target temperature, for example by rotating the outer ring in the example of the thermostats of FIGS. 3A-C. In step 912, the thermostat's processing system calculates a time estimated to reach the target temperature. In step 914 the estimated time is displayed to the user. The steps 912 and 914 are preferably performed quickly, such as a few hundreds of milliseconds or less, such that the user perceives a nearly instantaneous response to the new target temperature input. In step 916, the user views the displayed estimated time and decides in step 918 if the new target should be kept in light of the estimated time to reach the new target temperature. If the estimated time is not reasonable, the user sets a new target. If the estimated time is reasonable, in step 920, the target temperature is kept and the HVAC system heats or cools the enclosure to the new target temperature. It has been found that if the calculation and display is performed in real time, a beneficial education of the user as to the workings, efficiencies and limitations of the HVAC system is provided.

According to some embodiments, the HVAC system being controlled by the thermostat as described herein includes a multi-stage heating and/or multistage cooling system. It has been found that real time calculation and display as described in the flow chart of FIG. 9 is especially useful to educating users in the case where multi-stage heating and/or cooling is used. In the case of multi-stage heating or cooling, providing real-time feedback to the user of manual target temperature changes informs the user as to how large of a change is required in order for a second stage to be activated.

According to some embodiments the HVAC system being controlled is one in which the user is likely to be relatively unsophisticated in terms of HVAC technology and operation. In such cases the education of user as described is highly beneficial. Thus, according to some embodiments, the use of the techniques described herein are preferably used in residential and/or light commercial HVAC installations. Such systems commonly have a maximum cooling capacity of about 5 tons.

Figure 10:
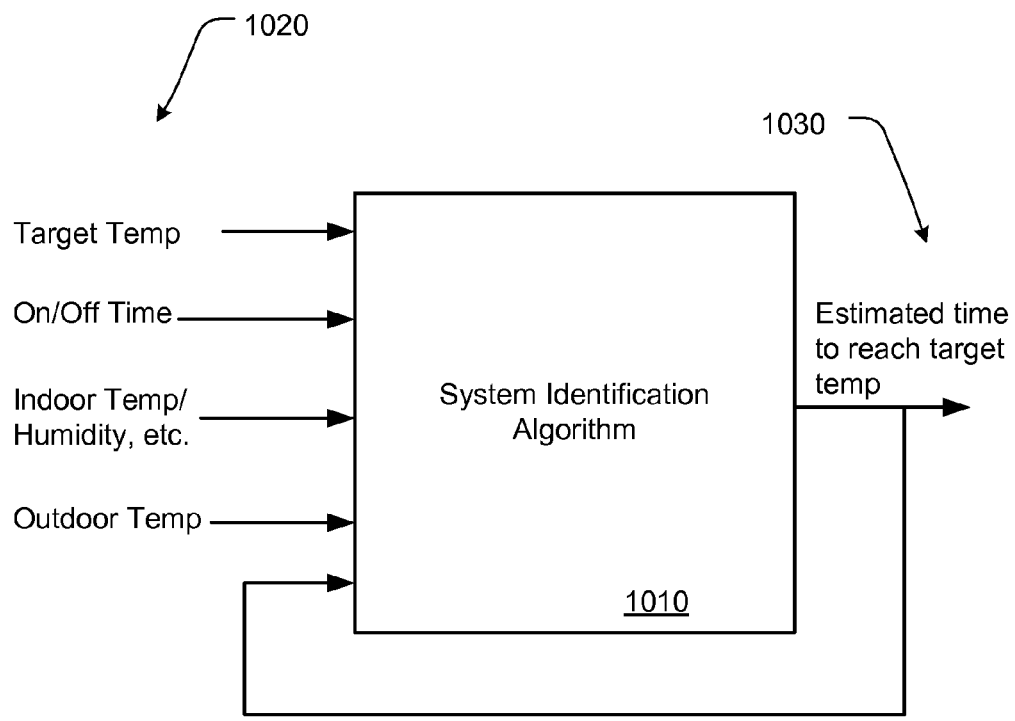
FIG. 10 is a block diagram illustrating the calculation of a time to reach a target temperature, according to some embodiments.

FIG. 10 is a block diagram illustrating the calculation of a time to reach a target temperature, according to some embodiments. A model of thermodynamic characteristics of the enclosure is preferably used. For further details of such models, please refer to co-pending U.S. patent application Ser. No. 12/881,463 entitled "Thermodynamic Modeling for Enclosures," filed on Sep. 14, 2010 (hereinafter "the '463 Application") which is incorporated herein by reference. According to some embodiments, a system identification algorithm 1010 is used as described in the '463 Application.

According to some embodiments, system identification algorithm in 1010 is a mathematical model that can learn the dependence of time to temperature on several thermal and climate factors. According to some embodiments, the inputs 1020 can include both current indoor temperature and a window of temperature measurements immediately prior to the calculation. Other inputs can be an indicator of whether a single stage or several stages of cooling or heating are activated at the time. The algorithm may also take the length of each of the cooling or heating time elapsed. Other environmental factors such as outdoor temperature, indoor and/or outdoor humidity can also be inputs to the algorithm. The output 1030 of the algorithm is the estimated time to reach the target temperature. In some embodiments, the output may also contain an optional statistical confidence value representing our belief in the estimate.

The algorithm may learn the dependence of the outputs on the inputs using statistical methods and machine learning algorithms. For example, the computation may be done using a weighted mean of past observations, linear or non-linear regression, recursive filtering including Kalman filtering or other online or batch system identification methods for dynamical systems.

According to some embodiments, the computation is carried out continuously to account for continually changing inputs. The display of the time to temperature is updated continually to reflect the current estimate from the algorithm.

According to some embodiments, other types of algorithms are used to calculate the time to reach a target temperature. For example other techniques can be used to calculate certain intermediate values, such as house rest temperature, which can be used along with current temperature and outdoor temperature to calculate the time to target. According to some embodiments, a look up table is used in the algorithm 1010.

According to some embodiments the computation system that carries out the algorithm may reside at a location external to the thermostat, such as a computer located within the structure being conditioned or a computer or processing system located at a remote location. According to such embodiments, the computer or processing system making the computation may communicate with the thermostat to gather the inputs and communicate back the output for display.

According to some embodiments, the computation and display is made to the user during the time in which an observer sees the display. According to some embodiments, the computation and display is made in less than about 1 second. According to some embodiments, the computation and display is made in less than about 0.5 seconds.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat, comprising:
an electronic display;
a heating, ventilation, and air conditioning (HVAC) system control interface;
a user input component that receives user input;
a processing system comprising one or more processors, the processing system being in communication with the electronic display, the HVAC system control interface, and the user input component and the processing system being configured to:
calculate a first time to reach a target temperature using a first configuration of the HVAC system;
calculate a second time to reach the target temperature using a second configuration of the HVAC system, wherein:
the second configuration of the HVAC system represents a more energy intensive configuration than the first configuration of the HVAC system; and
the second time is shorter than the first time; and
output the first time and the second time to the electronic display for simultaneous presentation.

2. The thermostat of claim 1, wherein the processing system is further configured to:
output, to the electronic display, the target temperature to the electronic display for simultaneous presentation with the first time and the second time.

3. The thermostat of claim 1, wherein: the first configuration of the HVAC system involves only a first stage of the HVAC system being activated; and the second configuration of the HVAC system comprises the first stage of the HVAC system being activated in combination with a second stage of the HVAC system being activated.

4. The thermostat of claim 1, wherein the user input component comprises a circular rotatable ring that rotates clockwise and counterclockwise, the circular rotatable ring encircling the electronic display of the thermostat.

5. The thermostat of claim 4, wherein the processing system is further configured to:
increase the target temperature in response to user input that rotates the circular rotatable ring clockwise; and
decrease the target temperature in response to user input that rotates the circular rotatable ring counterclockwise.

6. The thermostat of claim 5, wherein the processing system is further configured to, in response to the user input that rotates the circular rotatable ring:
recalculate the first time to reach an increased or decreased target temperature using the first configuration of the HVAC system;
recalculate the second time to reach the increased or decreased target temperature using the second configuration of the HVAC system; and
output the recalculated first time and the recalculated second time to the electronic display for simultaneous presentation.

7. A method for using a thermostat to control a heating, ventilation, and air conditioning (HVAC) system, the method comprising:
calculating, by the thermostat, a first time to reach a target temperature using a first configuration of the HVAC system;

calculating, by the thermostat, a second time to reach the target temperature using a second configuration of the HVAC system, wherein:
the second time is shorter than the first time; and
simultaneously presenting, by the thermostat, the first time and the second time on an electronic display of the thermostat.

8. The method for using the thermostat to control the HVAC system of claim 7, the method further comprising:
presenting by the thermostat, the target temperature on the electronic display of the thermostat, wherein the target temperature is presented simultaneously with the first time and the second time.

9. The method for using the thermostat to control the HVAC system of claim 7, wherein: the first configuration of the HVAC system comprises only a first stage of the HVAC system being activated; and the second configuration of the HVAC system comprises the first stage of the HVAC system being activated in combination with a second stage of the HVAC system being activated.

10. The method for using the thermostat to control the HVAC system of claim 7, the method further comprising:
increasing, by the thermostat, the target temperature in response to user input that rotates a circular rotatable ring of the thermostat clockwise, wherein the circular rotatable ring encircles the electronic display; and
decreasing, by the thermostat, the target temperature in response to user input that rotates the circular rotatable ring counterclockwise.

11. The method for using the thermostat to control the HVAC system of claim 10, the method further comprising:
in response to the user input that rotates the circular rotatable ring, recalculating, by the thermostat, the first time to reach an increased or decreased target temperature using the first configuration of the HVAC system;
in response to the user input that rotates the circular rotatable ring, recalculating, by the thermostat, the second time to reach the increased or decreased target temperature using the second configuration of the HVAC system; and
presenting, by the thermostat, the recalculated first time and the recalculated second time for simultaneous presentation on the electronic display of the thermostat.

12. A non-transitory processor-readable medium for a thermostat comprising processor-readable instructions configured to cause one or more processors of the thermostat to:
calculate a first time to reach a target temperature using a first configuration of a heating system;
calculate a second time to reach the target temperature using a second configuration of the heating system, wherein:
the second time is shorter than the first time; and
output for presentation the first time and the second time to an electronic display of the thermostat for simultaneous presentation.

13. The non-transitory processor-readable medium of claim 12, wherein the processor-readable instructions are further configured to cause the one or more processors to:
output, to the electronic display, the target temperature to the electronic display for simultaneous presentation with the first time and the second time.

14. The non-transitory processor-readable medium of claim 12, wherein: the first configuration of the heating system involves only a first stage of the heating system being activated; and the second configuration of the heating system comprises the first stage of the heating system being activated in combination with a second stage of the heating system being activated.

15. The non-transitory processor-readable medium of claim 12, wherein the processor-readable instructions are further configured to cause the one or more processors to:
increase the target temperature in response to user input that rotates a circular rotatable ring clockwise, wherein the circular rotatable ring rotates clockwise and counterclockwise; and
decrease the target temperature in response to user input that rotates the circular rotatable ring counterclockwise.

16. The non-transitory processor-readable medium of claim 15, wherein the processor-readable instructions are further configured to cause the one or more processors to: in response to the user input that rotates the circular rotatable ring:
recalculate the first time to reach an increased or decreased target temperature using the first configuration of an HVAC system;
recalculate the second time to reach the increased or decreased target temperature using the second configuration of the HVAC system; and
output the recalculated first time and the recalculated second time to the electronic display for simultaneous presentation.

* * * * *